United States Patent Office 3,451,284
Patented June 24, 1969

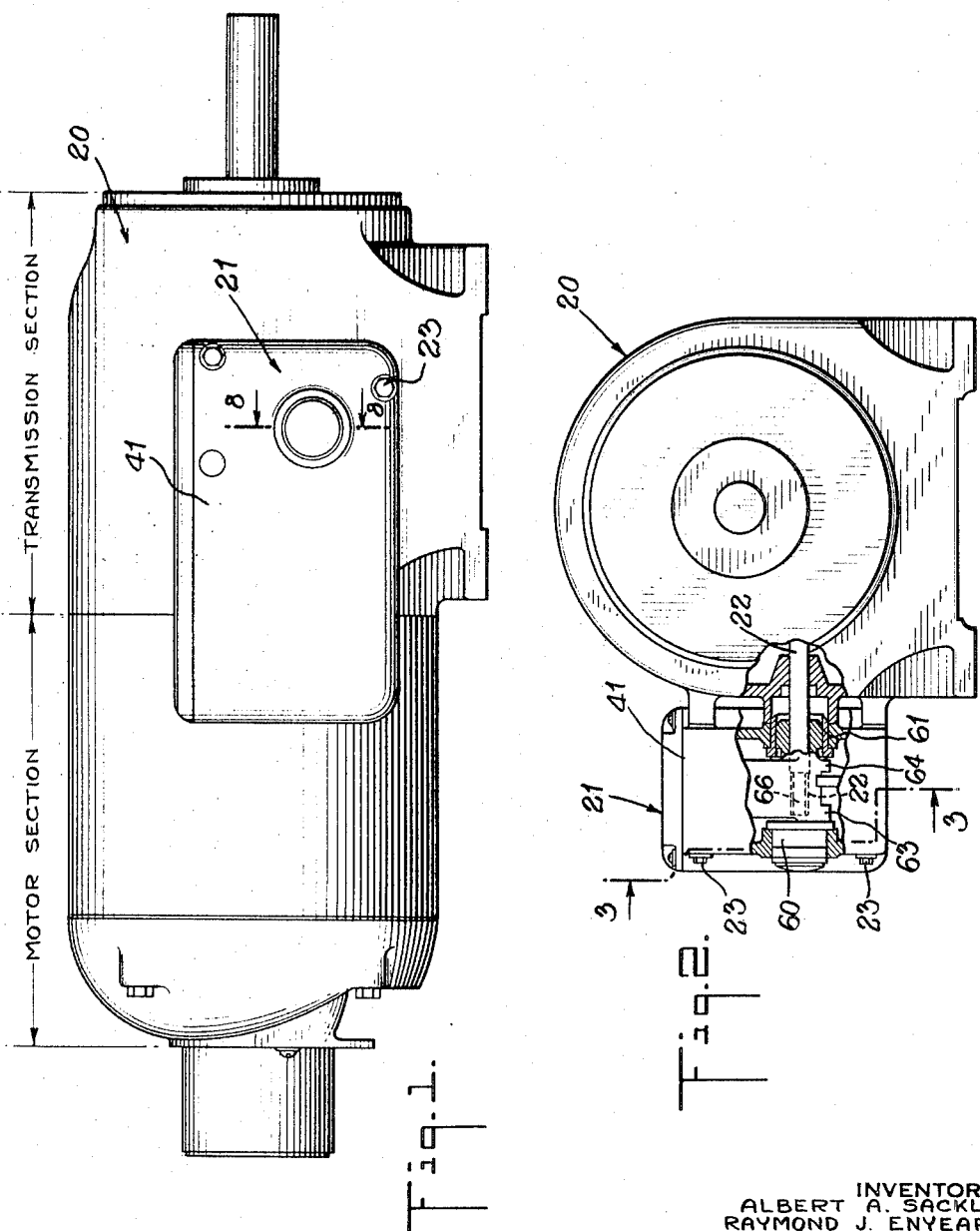

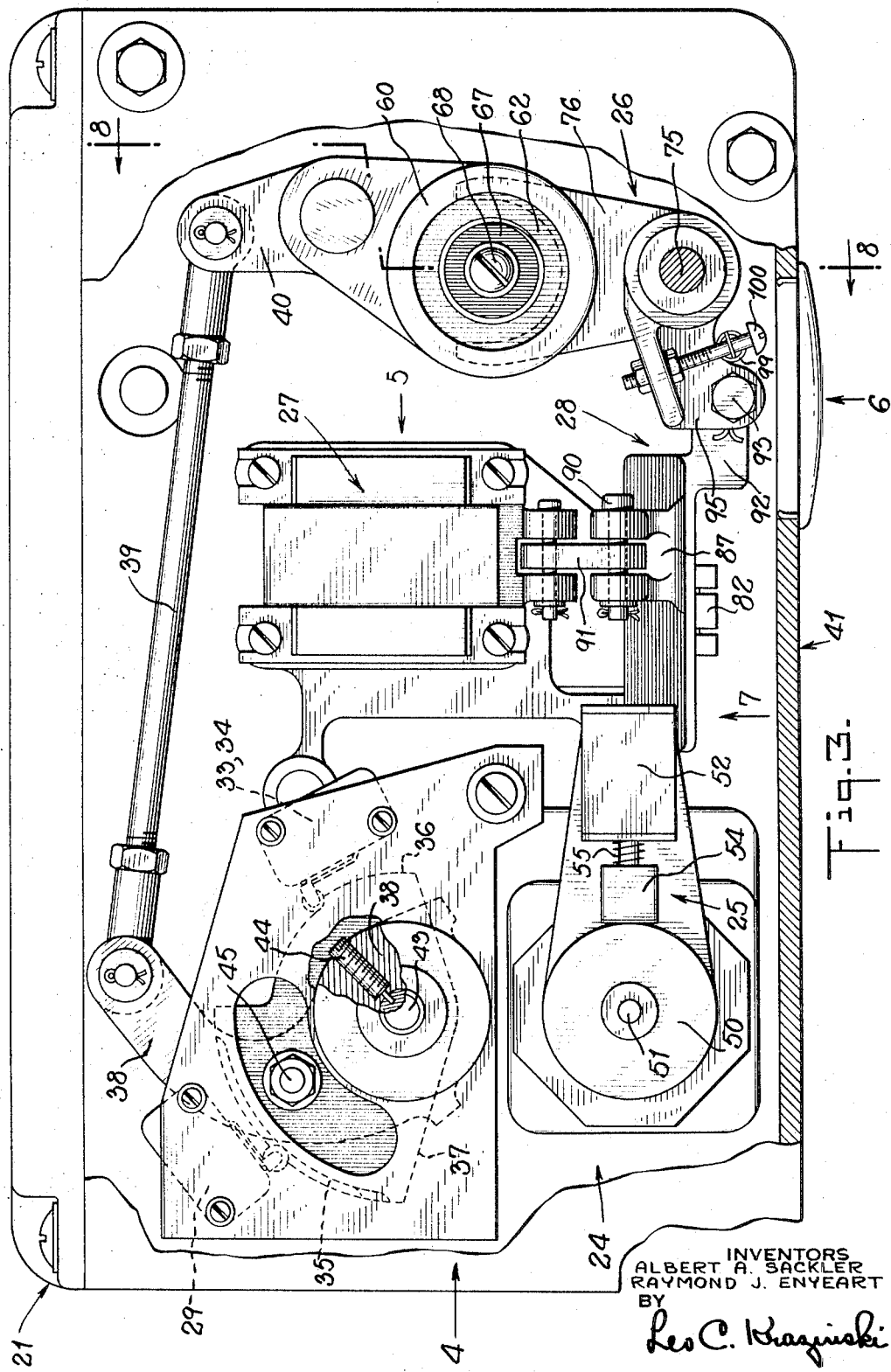

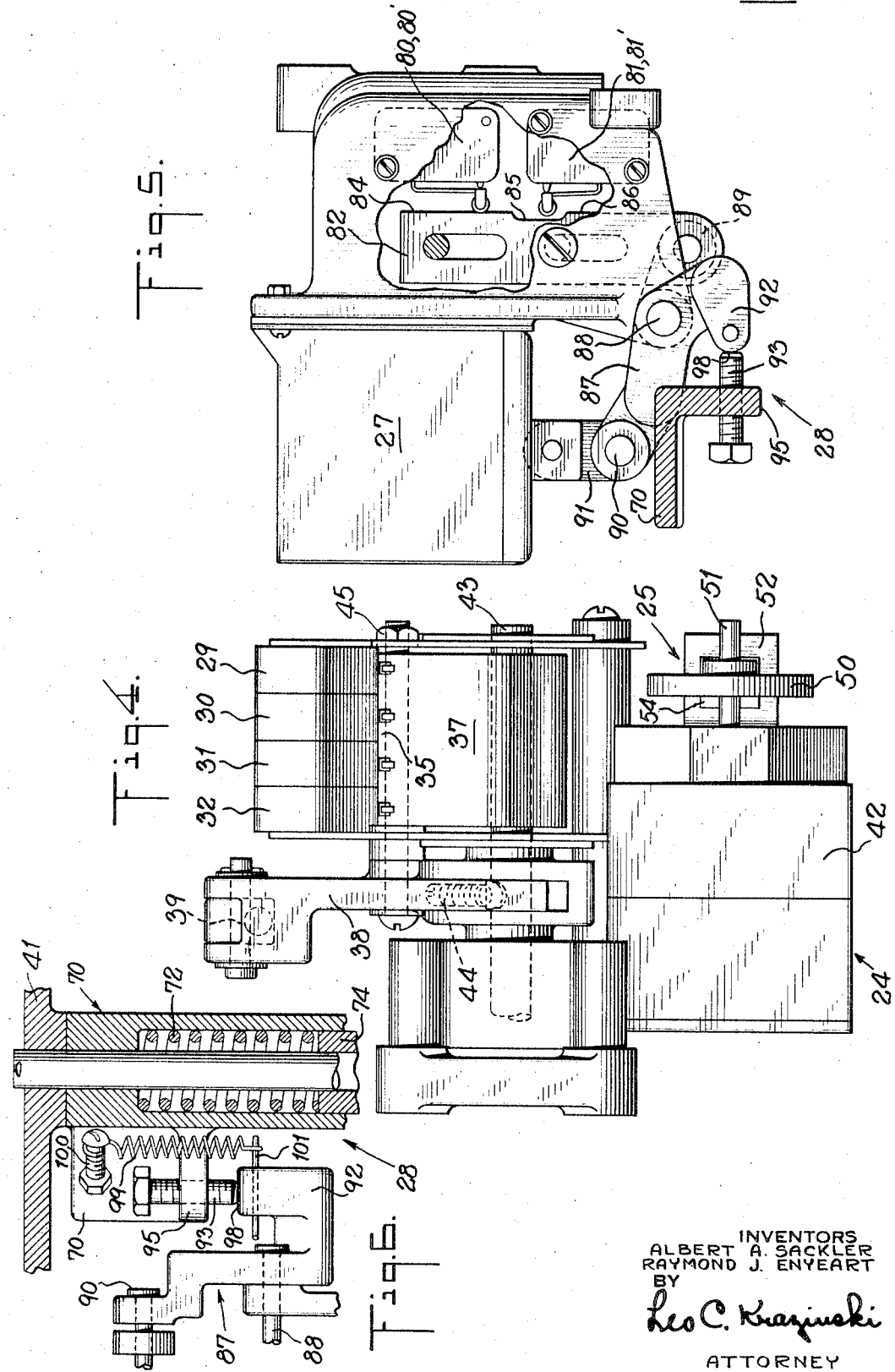

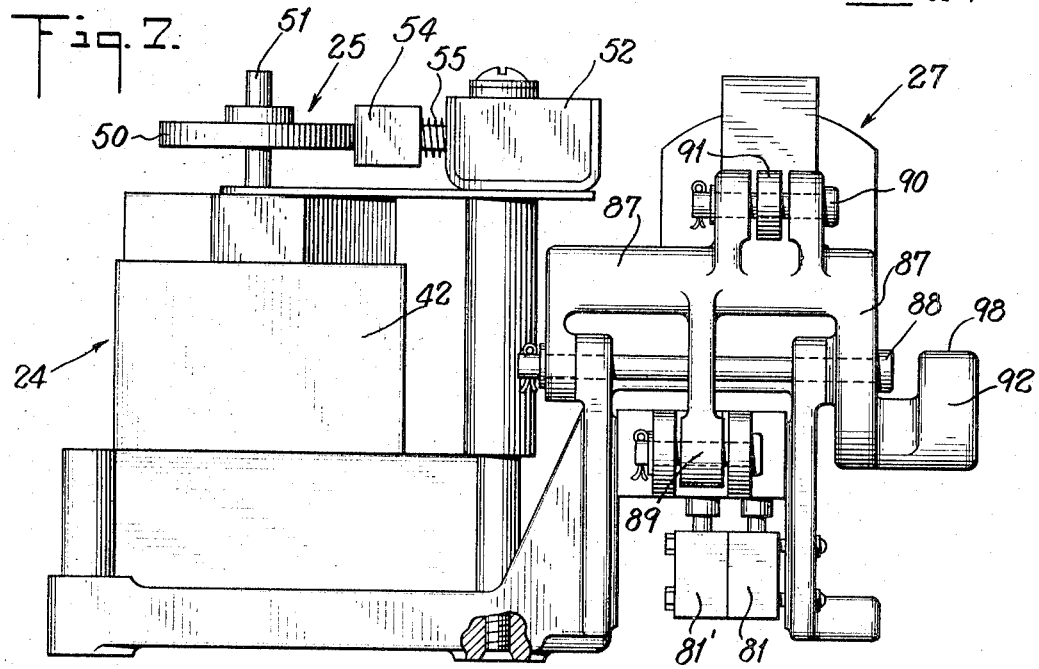
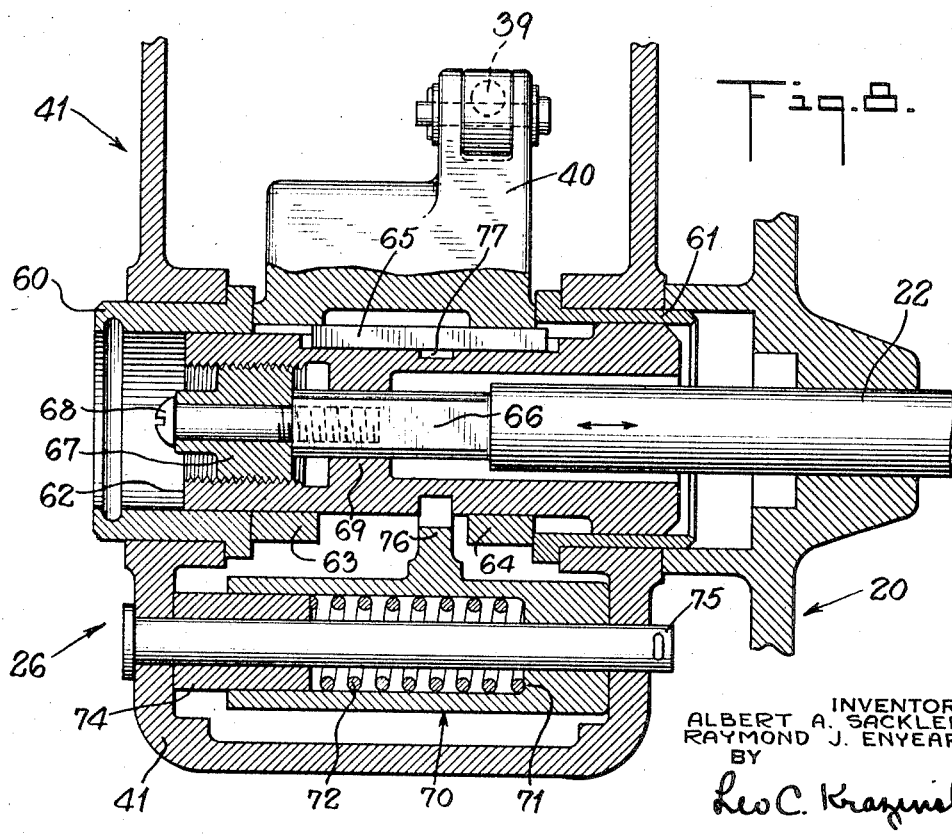

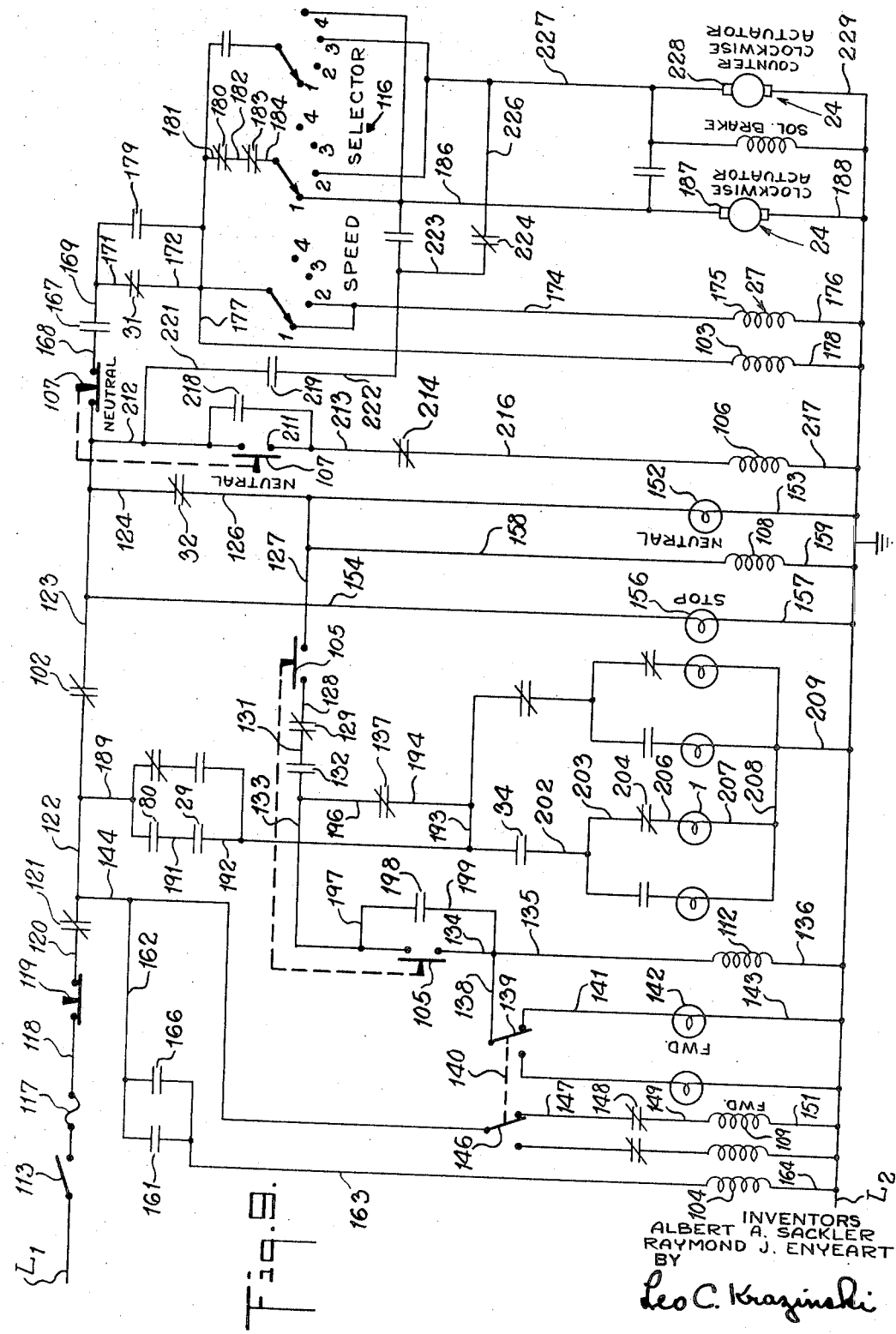

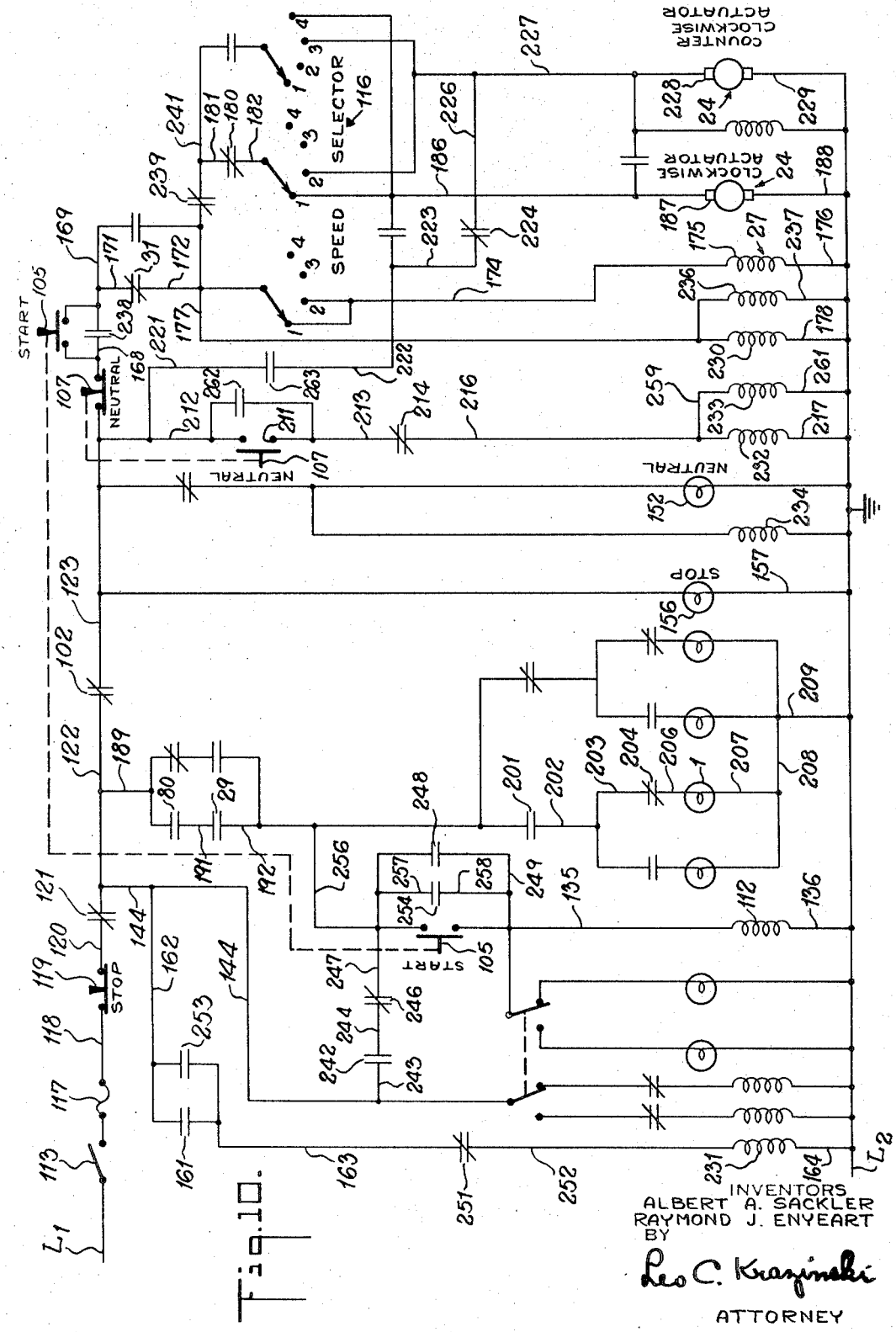

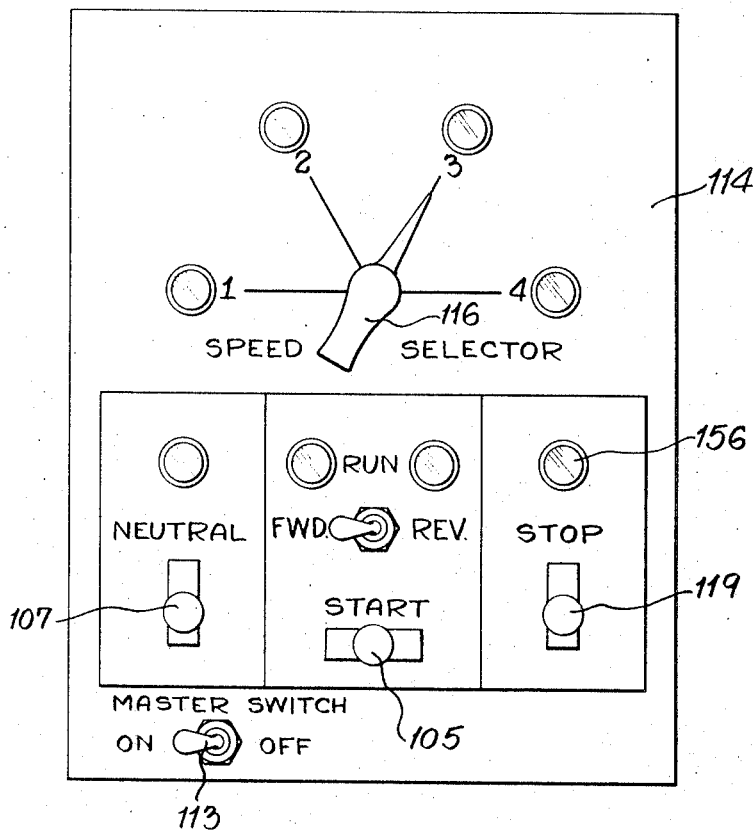

3,451,284
TRANSMISSION CONTROL APPARATUS
Albert A. Sackler and Raymond J. Enyeart, Westport, Conn., assignors to Condec Corporation, Stamford, Conn., a corporation of New York
Filed Mar. 30, 1967, Ser. No. 627,131
Int. Cl. F16h 3/38
U.S. Cl. 74—339   14 Claims

ABSTRACT OF THE DISCLOSURE

A mechanism for shifting gears from a remote location of a transmission having four speeds with speed positions arranged in an H pattern including an electric actuator for controlling linear motion of a gear shifter along legs of the H pattern and a solenoid for controlling motion of the gear shifter along the crossbar of the H pattern.

BACKGROUND OF THE INVENTION

Field of invention

The invention relates to transmissions having a train of gears which can be shifted to provide a plurality of output speeds and, more particularly, to an improved push-button arrangement for shifting the gears from a remote location whereby any of the four speeds can be selected through a combination of actuator and solenoid motions.

Summary of the invention

The invention relates to a transmission gear shifter and has for its primary object to control the gear shifter from a remote location.

Another object of the invention is to provide such a gear shifter which does not require a clutch.

A further object is to provide such a gear shifter which prevents tooth damage to the gears while they are being meshed.

With the above objects in view, one embodiment of the invention discloses a transmission of conventional type arranged for forward and reverse rotation with a gear train arranged for shifting motions in classic H pattern having speeds 1 and 2 on one leg of the H pattern, speeds 3 and 4 on the other leg of the H pattern, and a neutral position on the crossbar between the two legs thereof. The shifting mechanism of the invention includes an electrical actuator which moves the gearshift along the legs of the H pattern and a solenoid, when energized, moves the gearshift along the crossbar. When the solenoid is deenergized, a spring keeps the gearshift biased to one side of the crossbar while the transmission is in a neutral position. Thus, any speed can be selected through a combination of actuator and solenoid motions, it being required that the proper sequence and sense of motion be applied to the two movements. An important feature, however, is that the transmission drive motor is "jogged," that is, part of the gear train to be meshed is rotated initially at the start of the shift to permit clashless mesh of the gears. In other words, during the initial shifting operation the gear train is free wheeling.

In a second embodiment of the invention the shifting of gears is also accomplished without clashing of gears, by a delayed, timed jog of the transmission motor.

Brief description of the drawings

A more complete understanding of the invention will be obtained from the following description of two preferred embodiments thereof, taken in connection with the accompanying drawings in which:

FIG. 1 is a side elevational view of a transmission controlled by a shifter in accordance with the present invention.

FIG. 2 is an end view, looking at the right side of FIG. 1, of the transmission with a portion of the shifter in section to illustrate details thereof.

FIG. 3 is an enlarged sectional view of the shifter taken along the line 3—3 on FIG. 2 with the actuator cam in neutral position and the shifter solenoid in raised, energized position.

FIG. 4 is an end view of the shifter internal parts (housing removed) looking in the direction of the arrow 4 on FIG. 3.

FIG. 5 is an end view of a portion of the shifter looking in the direction of the arrow 5 on FIG. 3.

FIG. 6 is a view of a detail of the shifter looking in the direction of the arrow 6 on FIG. 3.

FIG. 7 is a bottom plan view of a portion of the shifter looking in the direction of the arrow 7 on FIG. 3.

FIG. 8 is a sectional view taken along the line 8—8 on FIG. 3.

FIG. 9 is a wiring diagram of a network for controlling the shifter in accordance with the first embodiment of the invention.

FIG. 10 is a wiring diagram of another network for controlling the shifter in accordance with the second embodiment of the invention.

FIG. 11 is a front elevational view of a control panel for operating electrical components of the networks.

Referring now to the drawings in detail, there is shown in FIGS. 1 and 2 a transmission 20 having a gear train shifter 21 mounted thereon. The transmission is of conventional type arranged for forward and reverse rotation and has a gear train (not shown) adapted to provide four output speeds. The transmission is shifted in the classical H pattern with speeds 1 and 2 at the top and bottom, respectively, on the left leg of the H, speeds 3 and 4 at the bottom and top, respectively, on the right leg of the H, and a neutral position on the crossbar between the legs, as indicated hereinbelow.

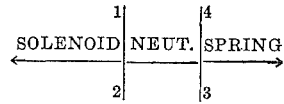

As will be explained in detail hereinafter, the shifter 21 includes an electrical actuator which performs the motions required along the legs of the H and a solenoid, which when energized performs through a shaft 22 (FIGS. 2 and 8) the motion required at the crossbar of the H. When this solenoid is deenergized, a spring keeps the shaft 22 biased to one side of the crossbar while the transmission is in neutral. In this manner, any of the four speeds may be selected by a combination of actuator, solenoid and spring motions.

Referring now to FIGS. 3 and 4, the shifter 21 and its various components are illustrated in detail. The shifter 21 generally comprises an actuator 24, a brake 25 for the actuator, a shifting mechanism 26 operated by a solenoid 27 through linkage 28, limitswitches 29, 30, 31, 32, 33 and 34 operated by cam surfaces 35 and 36 on a cam member 37 which is mounted on an arm 38 of the actuator 24, and a connecting rod 39 having one end swiveled on the actuator arm 38 and having its other end swiveled on an arm 40 of the shifting mechanism 26. These components are mounted in a casing 41 which is secured to the transmission 20 by bolts 23 (FIGS. 1 and 2).

The transmission actuator 24 is conventional and includes motor means 42, arranged to provide a clockwise and counterclockwise rotation at its output shaft, 43, so that the connecting rod 39 can be driven in forward and reverse directions. The output shaft 43 is shown rigidly connected to the arm 38 by a set screw key 44 while the cam 37 is secured to the arm 38 by a bolt-nut combination 45. Thus rotation of the actuator output shaft 43 causes movement of arm 38 and in turn cam 37 to actuate the limitswitches 29, 30, 31, 32, 33 and 34, as will be described hereinafter.

The actuator brake 25, FIGS. 3 and 7, comprises a brake disc 50, mounted on the actuator motor means shaft 51 for rotation therewith, a solenoid 52, and a brake shoe 54 operated by the solenoid 52 to bear against brake disc 50 when it is desired to stop the actuator motor means 42. When the actuator 24 is energized, the brake solenoid 52 is also energized, so that the brake shoe 54 is retracted away from the disc 50. Conversely, when the actuator 24 is deenergized, the solenoid 52 is likewise deenergized and the brake shoe is biased against the disc 50 by a spring 55.

The shifting mechanism 26 (FIGS. 3 and 8) comprises an arrangement responsive to the arm 40 for rotatively shifting the transmission shaft 22. In order to accomplish this, opposite side walls of the casing 41 are provided with bushings 60 and 61, and a hollow sleeve 62 is rotatably and slidably mounted in the bushings. The arm 40 has two annular end sections 63 and 64 which extend around the sleeve 62 and abut against the bushings 60 and 61, respectively. A key 65 connects the arm 40 for rotation with the sleeve 62 but allows the sleeve 62 to slide with respect to the end sections 63 and 64. The shaft 22 extends through the sleeve 62 and is secured thereto for sliding and rotating movements therewith. The shaft 22 is longitudinally adjustable a predetermined amount in sleeve 62 and for this purpose is provided with a reduced, internally threaded end portion 66, which abuts against a nut 67 threaded into a tapped end section of the sleeve 62, the nut 67 being locked to the shaft end portion 66 by a screw 68. The shaft end portion 66 is preferably squared along its outer periphery and is disposed in a similarly squared hub 69 of the sleeve 62 to assure rotational movement of shaft 22 with sleeve 62.

As already mentioned, the shaft 22 is biased in one position by a spring. A spring arrangement for this purpose is mounted in the casing 41 beneath the sleeve 62 (FIG. 8) and comprises a tubular body 70 having an open end and an apertured end formed with a shoulder 71, a compression spring 72 in the tubular body 70 having one end engaging the shoulder 71, a bearing collar 74 having one end extending into the open end of the tubular body 70 and being engaged by the other end of the spring 72 while the other end of the collar 74 is urged against the inner side wall of the casing 41, and a mounting rod 75 extending through the tubular body 70, the spring 72, the collar 74 and opposite side walls of the casing 41. The tubular body 70 has a radially extending bifurcated fork 76 on its exterior which fits into an annular groove 77 formed on the exterior of the sleeve 62. The fork 76 connects the sleeve 62 to the tubular body 70 for sliding movement therewith but allows the sleeve 62 to rotate with respect to the tubular body 70.

The linkage 28 operated by the solenoid 27 is illustrated in FIGS. 3, 5, 6, 7 and 8. This linkage includes an arrangement (FIGS. 5 and 7) for controlling two pairs of limit switches 80, 80' and 81, 81'; an arrangement (FIG. 6) for sliding the tubular body 70 and in turn the shafts 62 and 22 from right to left (FIG. 8); and an arrangement (FIGS. 3 and 6) for turning the sleeve 62 and shaft 22 under control of arm 40, which responds to movement of the connecting rod 39, and arm 38 of the actuator 24.

The arrangement (FIG. 5) for actuating the switches 80, 80' and 81, 81' includes a linear cam 82 mounted for up and down movement, as viewed in FIG. 5, and having cam surfaces 84, 85 and 86 for controlling the switches; a bell crank 87 pivotally mounted on a pin 88 and having one end 89 connected to the linear cam 82 to operate the same, a second end 90 pivotally connected to the armature 91 of the solenoid 27, and a third end 92 contacting an adjustment screw 93 threadedly mounted on a lug 95 extending from the tubular body 70.

The arrangement (FIGS. 5, 6 and 8) for sliding the sleeve 62 and shaft 22 (neutral position of gear shift of H pattern) includes the lug 95 (FIGS. 5 and 6) extending from the back of the tubular body 70 as viewed in FIG. 8; the arm 92, which is integral with the bell crank 87 and which is moved by the solenoid 27 and which further has an end portion 98 engaged by the screw 93. Thus movement of the armature 91 causes the bell crank 87 to move the lug 95 and in turn the tubular body 70, fork 76, sleeve 62 and shaft 22. A tension spring 99 having one end fastened to a fixed reaction screw 100 on tubular body 70 and its other end to a pin 101 on end 92 adjacent surface 98 of the bell crank 87 holds the two parts 98 and 93 in constant engagement.

The foregoing description is concerned primarily with the mechanical means for causing lateral movement of the shifting mechanism along the neutral crossbar of the H pattern. For a description of the shifting mechanism along the legs of the H pattern, reference will now be made to the electrical components shown in FIG. 9.

The limitswitch 29, as also shown in FIGS. 3 and 4, is controlled by the cam surface 35 and senses completion at either top or bottom of the left vertical leg, that is, transmission speeds 1 and 2, the switch 29 having a normally open contact which closes when the shift has been completed.

The limitswitch 30, as also shown in FIG. 4, is controlled by the cam surface 35 and senses completion at either top or bottom of the right vertical leg, that is, transmission speeds 3 and 4, the switch 30 having a normally open contact which closes when the shift has been completed.

The limitswitches 31 and 32, also shown in FIG. 4, are controlled by cam surface 35 and each switch senses when the transmission is in neutral. Each switch has a normally open contact which closes when the transmission is in the neutral position, that is, in the crossbar of the H pattern.

The limitswitches 33 and 34, also shown in FIG. 3, are controlled by cam surface 36 and each switch senses which direction the shifter is out of neutral position, along the legs of the H pattern. Each switch is of the single pole double throw type (SPDT). In switch 33 the normally closed contact closes when the shifter is out of the neutral position, that is, towards speed 1 or 4 while the normally open contact closes when the shifter is out of the neutral position, that is, towards speed 2 or 3. In switch 34 the normally closed contact closes when the shifter is towards speed 2 or 3 while the normally open contact closes when the shifter is towards speed 1 or 4.

The limitswitches 80 and 80', also shown in FIG. 5, are controlled by cam surfaces 84 and 85 and senses position of the shifter at the ends of the crossbar of pattern H. This switch is of the single pole double throw type (SPDT) in which the normally closed contact is closed when the solenoid is released and when the spring 72 moves the sleeve 62 to the right, as viewed in FIG. 8, and in which the normally open contact closes when the solenoid 27 is energized.

The limitswitches 81 and 81', also shown in FIG. 5, are controlled by cam surfaces 85 and 86 and sense position of the shifter at the ends of the crossbar of pattern H. Each of these switches is of the single pole double throw type (SPDT) in which the normally closed contact is closed when the solenoid 27 is energized and in which the normally open contact is closed when the solenoid 27 is released and the sleeve 62 retracted by the spring 72 (FIG. 8).

A limitswitch 102 has a normally closed contact which is centrifugally controlled and which contact is opened when the speed of the transmission drive motor exceeds about 200 r.p.m., whereby all power to the shift circuit is disconnected while the transmission drive motor is running.

A double pole double throw relay 103, in which only the normally open contact of one pole is used, closes its contact when limitswitch 29' opens upon leaving neutral to provide a power locking circuit to the shift circuit.

A quadruple pole double throw relay 104 is used for jogging the actuating motor 42 and for locking in a gear shifting cycle after a start button 105 (FIG. 11) has been depressed.

A triple pole double throw relay 106 is used to lock in a gear shifting cycle from any speed to neutral after a neutral button 107 has been depressed.

A doublet pole double throw relay 108 is used to stop a gear shifting cycle from any speed to neutral after the neutral position has been reached.

A relay 109 is used for forward rotation and a relay 111 for reverse rotation of the transmission drive motor.

A magnetic starter 112, when energized, is used for starting the transmission drive motor.

The shift solenoid 27 is of the pull type, intermittent duty and, when energized, performs the motion required at the crossbar, the spring 72 keeping the shifter biased to the 3-4 side of the crossbar when the transmission is in neutral.

The electric rotary actuator 24 is a capacitor type motor with a solenoid brake 25 and performs the motions required along the legs of the H pattern.

The invention will now be more clearly understood by describing operation of a typical shift cycle. Assume that the transmission 20 is in neutral position, the transmission motor (not shown) is stationary, and it is desired to shift into forward speed 1, the lowest output speed of the transmission. Referring to the drawings, particularly to FIGS. 9 and 11, the master switch 113 on control panel 114 is closed to the "On" position and the speed selector switch pointer 116 is turned to position 1, after which start button 105 is pressed. A source of conventional power, such as 115 volts, 60 cycles per second, is then connected in a circuit that can be traced from line L1 through closed master switch 113, fuse 117, conductor 118, closed stop switch 119, conductor 120, heater 121, conductor 122, closed centrifugal limit switch 102, conductors 123 and 124, narrow band neutral switch 32, conductor 126, conductor 127, first pole of closed start switch 105, conductor 128, normally closed contact 129 of relay 104, conductor 131, closed contact of normally open contact 132, since the transmission is in neutral, and thence over conductor 133 through 2nd pole of closed start switch 105 over conductor 134, and thence in one path over conductor 135 and through magnetic starter coil 112 to grounded lead L2 over conductor 136 to energize starter coil 112. At this point normally closed contact 137 of relay 108 is open, relay 108 being energized, as will appear hereinafter. Consequently, no current can flow to any of the speed lights. The other path from conductor 134 may be traced over conductor 138 through contact 139 of forward-reverse switch 140, which is shown in the forward position, and thence over conductor 141 through forward lamp 142 and thence to grounded lead L2 over conductor 143. Forward lamp 142 is illuminated. At conductor 122 adjacent heater 11 another path for power flow may be traced over conductor 144 through contact 146 of forward reverse switch 140 over conductor 147 through normally closed contact 148 of forward relay 109, over conductor 149 and thence through winding of forward relay 109 to grounded lead L2 over conductor 151. Neutral lamp 152 is illuminated by power passing from conductor 126 through lamp 152 and thence over conductor 153 to grounded lead L2; the stop lamp is also illuminated by power passing from conductor 123 over conductor 154 through stop lamp 156 and thence over conductor 157 to lead L2; and relay 108 is energized by power passing from conductor 127 over conductor 158 through winding of relay 108 and thence over conductor 159 to lead L2.

Upon energization, starter coil 112 closes its contact 161, completes an energizing circuit for relay 104 and starts the transmission drive motor (not shown). Power can be traced from conductor 122 over conductors 144 and 162 through closed contact 161 and thence over conductor 163, winding of relay 104 and conductor 164 to lead L2. Relay 104 in operating closes its own contact 166 to provide a locking circuit therefor in an obvious parallel path with starter contact 161, and opens its normally closed contact 129 to thereby disconnect power to the starter coil 112 and in turn the transmission drive motor. The forward run lamp 142 is also extinguished. By initially rotating the transmission drive motor and then causing it to coast is termed herein as "jogging the motor," to facilitate meshing of gears, as will appear hereinafter. It is to be noted that, although the transmission motor is rotating, its speed is not great enough to open centrifugal switch 102. Relay 104 in operating also closes its contact 167.

During the coast-down of the transmission motor the gear train is free wheeling and with the closure of contact 167 power is passed from conductor 123 through closed neutral switch 107, over conductor 168, through closed contact 167, over conductors 169 and 171, through closed wideband limitswitch 31, over conductor 172 and thence in two paths, a first path continuing through terminal 1 of left bank of speed selector 116, over conductor 174, through coil 175 of shift solenoid 27 and over conductor 176 to lead L2 for energizing shift solenoid 27, and a second path continuing over conductor 177, through relay winding 103 and over conductor 178 to lead L2 for energizing relay 103. The shift solenoid 27 in operating moves the linkage 28 (FIG. 3), tubular body 70 (FIG. 8) and sleeve 62 to position the sleeve 62 and shaft 22 to the left side, as viewed in FIG. 8, of the H crossbar for shifting into speed 1. At the same time relay 103 in operating provides an obvious locking circuit for itself by closing its contact 179, which is in parallel with wideband switch 31. This locking circuit keeps the shift solenoid energized while a shifting operation is actually under way, although wideband switch 31 is opened as the shift control leaves neutral. It is to be noted that coil 175 of the shift solenoid 27 is energized only for shifts into transmission speeds 1 and 2.

When the solenoid 27 has completed its shift to the 1-2 side of the H cross bar, the normally closed contact 180 of limitswitch 81, which was previously open, is closed by raised linear cam 82 (FIG. 5), so that power now flows from conductor 177 over conductor 181, through closed contact 180, over conductor 182, closed contact 183 of relay 106, over conductor 184 and through terminal 1 of middle bank of speed selector 116, over conductor 186 and thence through clockwise terminal 187 of actuator 24 and over conductor 188 to lead L2 to energize the actuator 24. In operating, the actuator 24 (FIG. 3) rotates cam member 37, arm 38, connecting rod 39, arm 40, sleeve 62 (FIG. 8) and shaft 22 to shift the transmission into speed 1. When the transmission has been fully shifted, switch 29 is closed by the actuator cam 37 and accordingly allows power to pass from conductor 122 over conductor 189, through normally open switch 80, which was closed by linear cam 82 at the same time as contact 180 of switch 81, over conductor 191, through closed switch 29, over conductors 192, 193 and 194, through normally closed contact 137, over conductors 196, 133 and 197, through closed contact 198 of energized relay 104, over conductors 199 and 135 through magnetic motor starter coil 112 and over conductor 136 to lead L2. The transmission motor is now restarted and the forward run light 142 is again illuminated in a previously traced circuit. Simultaneously power at conductor 192 flows through closed contact of switch 34, which was closed when the actuator 24 started movement of its cam 37, over conductors 202 and 203, through normally closed contact 204 over conductor 206, through speed light 1, which is illuminated, and over conductors 207, 208 and 209 to lead L2.

As the transmission motor comes up to speed, centrifugal switch 102 opens, since the speed is above 200 r.p.m. and all power is disconnected beyond this switch, that is, to the shifting portion of the circuit. As a result coil 175 of shift solenoid 27, actuator 24 and relay 103 release. Also, both neutral switches, namely, wideband switch 31 and narrowband switch 32 will be open because the transmission is no longer in neutral. Thus, with these two neutral switches 31 and 32 open the transmission cannot be shifted to another gear while the transmission motor is running. The transmission must be returned first to neutral.

In accordance with the foregoing, the transmission motor is running in gear speed #1, the forward run light 142 is illuminated, speed light #1 is illuminated and the shifting circuit including the actuator circuit is disconnected. The transmission motor may be stopped and restarted at any time in the selected gear by respectively pressing the stop button switch 119 and start button switch 105. Depression of the stop button switch 119 disconnects power to the entire circuit including the motor starter 112. Depression of the start button switch 105 energizes the motor starter through the following components; normally closed stop switch 119, heater 121, limitswitches 80 and 29, closed contact 137, closed start switch 105 and motor starter coil 112. The start switch 105 is "latched in" by closed contact 198 of relay 104 as before when the motor starter was energized.

However, if a different speed is desired, it is necessary to stop the motor and return the transmission to neutral before a shift can be accomplished. This is because the narrowband switch 32 and the wideband switch 31 are open whenever the transmission is out of neutral, thus blocking power to the "jog" sequence and to the shift portion of the circuit described hereinbefore.

When the stop button switch 119 is momentarily pushed and released, and the transmission motor slows to a near stop, centrifugal limit switch 102 closes, since the motor speed is under 200 r.p.m., and permits power to pass through stop light 156 to illuminate the same as an indication that the neutral switch 107 is effective for actuation. Depressing the neutral button switch 107 closes neutral contact 211 and causes energization of relay 106 in a circuit that can be traced with power from conductor 123 (remembering that stop switch 119 is now closed) over conductor 212, through closed neutral contact 211, over conductor 213, through closed contact 214 of relay 108, over conductor 216, through winding of relay 106, and over conductor 217 to lead L2. Relay 106 in operating closes its contacts 218, which bridges neutral contact 211, so that when the neutral button switch 107 is released, contact 218 locks relay 106 in its operating condition. Relay 106 in operating also closes normally open contact 219 which permits power flow from conductor 212 over conductor 221, closed contact 219, over conductors 222 and 223, through normally closed contact 224, over conductors 226 and 227 through counter-clockwise terminal 228 of actuator 24 and over conductor 229 to lead L2. The actuator 24 reverses the previous movement of cam member 37, arm 38, connecting rod 39, arm 40, sleeve 62 and transmission shaft 22 to shift the gear train back to neutral. When the neutral condition is reached, both contacts 31 and 32 close, contact 31 readying the shifting circuit for the next gear selection. Closed contact 32 permits power flow to neutral light 152 and to relay winding 108. Neutral light 152 illuminated and relay 108 in operating its normally closed contact 137, now opened, blocks any power to the speed lights; at its normally open contact 132, now closed, provides a path for power to the motor starter coil 112 for the next shift; and at its normally closed contact 214, now opened, blocks current to the relay 106 and thereby prevents operation of the actuator 24, which stops the transmission in neutral. The transmission motor is now at rest, the stop lamp 156 and neutral lamp 152 are lighted and the circuit is now ready for another gear shift to any desired speed by using the speed selector 116 and start button 105 as previously described.

Each of the speed selections can be traced through the circuit in a similar manner to that already described. In this embodiment it is to be noted that the transmission motor is initially energized to start rotation of the gear train, the motor is then deenergized before it has reached a speed under 200 r.p.m. to permit the gear train to coast or "free wheel" so that meshing of gears is accomplished readily without tooth-to-tooth clashing. In the event a tooth of one gear meets head-on with a tooth of another gear, the gear teeth slide with respect to each other until a tooth of one gear slides into a dwell (opening) of the other gear, and this because the gear train is free wheeling.

Referrng now to FIG. 10 there is shown a circuit for the second embodiment of the invention, which second embodiment is distinguishable over the first embodiment by providing a predetermined timed interval before "jogging," so that it occurs after the gears have come "tooth to tooth" in the shifting cycle. A "jog" at this time moves one gear in reference to its mate insuring that the tooth of one gear is matched to the dwell or opening of the other gear, so that the shift proceeds into full mesh without clash and without the requirement of clutches or synchro-mesh mechanism. When this shift is completed, this fact is sensed and the transmission drive motor then automatically started.

The circuit of this second embodiment is substantially similar to that of the first embodiment except for incorporation there in of the timed "jog" feature which requires a change in a few of the relays and circuitry. Accordingly, only the newly added or changed circuit elements will be referred to hereinbelow.

A new relay 230 of the three pole double throw (3PDT) type replaces relay 103 of the first embodiment and is used to latch in the shift circuit and start switch 105 when normally closed wideband limitswitch 31 opens upon the shift mechanism leaving neutral position.

A new relay 231 of the double pole double throw (DPDT) type replaces relay 104 and assists in jogging the transmission drive motor. It is also used to latch in the start button 105 for all starts performed with the transmission already in gear.

Two new relays 232 (3PDT) and 233 (DPDT) replace relay 106 and are used to latch in shift cycle from any speed to neutral and to drop out relay 231 when neutral button 107 has been depressed.

A new relay 234 (DPDT) replaces relay 108 and is used to stop shift cycle from any speed to neutral when neutral has been reached.

A new time delay relay 236 (SPST) is added to incorporate a "jog" in the transmission drive motor one second after the beginning of the shift cycle.

As with the first embodiment, the invention incorporated in this second embodiment will be better understood by describing operation of a typical shift cycle. Assume, as heretofore, that the transmission 20 is in neutral position, the transmission motor (not shown) is at a standstill, and it is desired to shift into forward speed 1 of the transmission. Referring to FIGS. 10 and 11, the master switch 113 is turned to the "on" position and the speed selector pointer 116 is turned to position 1 on the panel 114, after which the start buttton 105 is depressed. Power is then connected in a circuit that can be traced from L1 through closed master switch 113, fuse 117, conductor 118, closed stop switch 119, conductor 120, closed heater switch 121, conductor 122, closed centrifugal limitswitch 102, conductor 123, closed neutral switch 107, conductor 168, one of the poles of start switch 105, conductors 169 and 171, closed wideband switch 31, conductor 172, and then in two paths, one path along terminal 1 of left bank of speed selector 116, conductor 174, coil 175 of shift solenoid 27 and conductor 176 to lead L2, and the other path along conductor 177 and through relay 230 and conductor 178 in parallel with time delay relay 236 and conductor 237 to lead L2. Relay 230 operates and closes all of its contacts while relay 236 starts its timed cycle. Simultaneously the shift solenoid 27 causes the shift mechanism to move to the correct side of the H crossbar for shifting into speed 1, as previously described. Relay 230 is latched in by its own closed contact 238 bridged across the start switch 105. This keeps the shift solenoid 27 energized when a shift is actually underway, although wideband switch 31 is opened as the shift mechanism leaves the neutral position. As in the first embodiment, the shift solenoid 27 is only energized for shifts into transmission speeds 1 and 2.

When the shift solenoid 27 has completed its travel, normally closed contact 180 of limitswitch 80 closes allowing power flow from conductor 177 through normally closed contact 239 of relay 232, over conductors 241 and 181, closed contact 180, conductor 182, terminal 1 of middle band of speed selector 173, conductor 186, clockwise terminal 187 of actuator 24 and conductor 188 to lead L2. The actuator 24 in operating commences its shifting motion towards speed 1. During the above sequence of operation time delay relay has been going through its time cycle. When one second has elapsed, its contact 242 closes, allowing power flow from conductor 122 over conductors 144 and 243, closed contact 242, conductor 244, normally closed contact 246 of relay 231, conductor 247, closed contact 248 of operated relay 230, conductors 249 and 135, motor starter coil 112 and conductor 136 to lead L2. In energizing, motor starter coil 112 starts the transmission drive motor and closes its contact 161, which in turn sets up an energizing circuit for relay 231 that can be traced from conductor 122 over conductors 144 and 162, closed motor starter contact 161, conductor 163, closed contact 251 of relay 233 conductor 252, winding of relay 231, and conductor 164 to lead L2. Relay 231 in operating latches itself in through its own normally open contact 253, closes a circuit across the start switch 105 through its normally open contact 254, and opens the circuit to the motor start coil 112 through opening of its normally closed contact 246. Thus power is disconnected from the transmission drive motor. This is the "jog." The short pulse of power to the transmission drive motor occurring one second after the shifting cycle got underway has permitted the shifted gear to meet its target gear in a case of tooth-to-tooth mismatch but then has rotated the shifter gear to align its teeth with the hollows (dwells) of the other gear to provide the desired mesh of gears.

The shift cycle now continues and, when the transmission has been fully shifted, switch 29 closes, passing power from conductor 122 over conductor 189, closed switch contact 80 (which closed the same time previously as contact 180 of switch 80 by shift solenoid 27), conductor 191, closed switch 29, conductors 192, 256, 247, 257, closed contact 254 of operated relay 230, conductors 258, 249, and 135, through motor starter coil 112 and conductor 136 to lead L2. Coil 112 in operating again starts the transmission drive motor. The direction of rotation of the transmission drive motor is controlled by the forward-reverse switch 140, as in the first embodiment.

Simultaneously with the preceding operation, power flows from conductor 192 through normally open contact 201, which was closed when the actuator 24 was energized, conductors 202 and 203, closed contact 204, conductor 206, through lamp 1 and over conductors 207, 208 and 209 to lead L2. Speed lamp 1 lights.

As the transmission drive motor comes up to speed, the speed switch 102 opens and all power is disconnected from the shifting portion of the circuit including the shift solenoid 27, actuator 24, relays 230 and 236, as in the first embodiment. Both neutral sensing switches 31 and 32 will be open because the transmission is no longer in neutral. No shifts of any kind can be made while the motor is running.

The motor may be stopped and restarted at any time in the selected gear by pressing the stop button 119 and the start button 105, as in the first embodiment. Here again, if a different speed is desired, it is necessary to stop the motor and return the transmission to neutral before a shift can be accomplished. When the stop button 119 is pushed and the transmission drive motor slows down to under 200 r.p.m. limit, switch 102 recloses and allows power to illuminate the stop lamp 156 and thereby indicate that the neutral button 107 can be operated. Depressing the neutral button 107 causes energization of relays 232 and 233 in a circuit that passes power from conductor 123 over conductor 212, closed contact 211 of neutral switch 107, conductor 213, normally closed contact 214 of relay 234, conductor 216 and thence over parallel paths, one path through winding of relay 232 and over conductor 217 and the other path over conductor 259 winding of relay 233 and conductor 261 to lead L2. Both relays 232 and 233 in operating actuate their contacts, contact 262 of relay 232 closing to provide a locking circuit around neutral button contact 211 for the relays 232 and 233. Also, normally open contact 263 of relay 232 closes to pass power from conductor 212 over conductor 221, closed contact 263, conductors 222 and 223, normally closed limit-switch contact 224, conductors 226 and 227, counterclockwise terminal 228 of actuator 24 and conductor 229 to lead L2. Actuator 24 in operating starts the shift back in the direction of neutral and, when neutral is reached, wideband switch 31 and narrowband switch 32 close, wideband switch 31 readies the shift portion of the circuit for the next shift selection while narrowband switch 32 passes power to illuminate neutral lamp 152 and energize relay 234 which opens its contact 214 to block power to the actuator 24 and thus stops the transmission shift mechanism in neutral.

The transmission drive motor is now stopped, the stop lamp 156 and the neutral lamp 152 are illuminated and the circuit is ready for another shift to any desired speed by use of the speed selector 116 and start button 105, as described hereinbefore.

From the foregoing description it will be seen that the present invention provides an improved means for shifting gears of a transmission from a remote location by push buttons without the use of a clutch and without clashing of gears.

As various changes may be made in the form, construction and arrangement of the parts herein, without departing from the spirit and scope of the invention and without sacrificing any of its advantage, it is to be understood that all matters are to be interpreted as illustrative and not in any limiting sense.

What is claimed is:

1. A transmission mechanism having a gear train for providing a plurality of output speeds of said gear train, the improvement which comprises means for selecting a desired output speed, means for starting rotation of a driving gear of said gear train, means for interrupting said starting means to cause said driving gear to rotate freely, and means for shifting a driven gear of said gear train in mesh with said driving gear to produce the desired output speed while said driving gear is rotating freely, said shifting means including a gear shifter for moving said driven gear, actuator means for controlling rotary motion of said gear shifter along a first path, and solenoid means for controlling linear motion of said gear shifter along a second path.

2. A transmission mechanism in accordance with claim 1 wherein said paths are in the form of an H pattern in which said first path corresponds to either of the two vertical legs and in which said second path corresponds to the horizontal cross-bar of the H pattern.

3. A transmission mechanism in accordance with claim 2, wherein resilient means bias said gear shifter to one side of said horizontal cross-bar when said solenoid means is ineffective, whereby said gear shifter is adapted to be moved along one of said vertical legs adjacent said one side of said horizontal cross-bar by said actuator means.

4. A transmission mechanism in accordance with claim 3, wherein said solenoid means is effective when energized to move said gear shifter to the other side of said horizontal cross-bar, whereby said gear shifter is adapted to be moved along one of said vertical legs adjacent said other side of said horizontal cross-bar by said actuator means.

5. A transmission mechanism in accordance with claim 3, and means for selectively controlling movement of said gear shifter by said actuator means either above or below said horizontal cross-bar along said one of said vertical legs adjacent said one side of said horizontal cross-bar.

6. A transmission mechanism in accordance with claim 4, and means for selectively controlling movement of said gear shifter by said actuator means either above or below said horizontal cross-bar along said one of said vertical legs adjacent said other side of said horizontal cross-bar.

7. A transmission mechanism in accordance with claim 1, wherein said actuator means include electric motor means responsive to said speed selecting means, and means interconnecting said motor means and said gear shifter.

8. A transmission mechanism in accordance with claim 7, wherein said solenoid means include electric solenoid means responsive to said speed selective means, and means interconnecting said solenoid means and said gear shifter.

9. A transmission mechanism having a gear train for providing a plurality of output speeds of said gear train, the improvement which comprises means for selecting a desired output speed, means for starting rotation of a driving gear of said gear train, means for interrupting said starting means to cause said driving gear to rotate freely, and means for shifting a driven gear of said gear train in mesh with said driving gear to produce the desired output speed while said driving gear is rotating freely, said starting means including a start switch, and a starting coil responsive to closure of said start switch for rotating said driving gear.

10. A transmission mechanism in accordance with claim whereien said interrupting means include relay means responsive to operation of said starting coil for deenergizing said starting coil and thereby permitting said driving gear to rotate freely.

11. A transmission mechanism in accordance with claim 9, and a centrifugal limit switch in series circuit with said starting coil for limiting rotation of said driving gear to less than 200 r.p.m.

12. A transmission mechanism having a gear train for providing a plurality of outer speeds of said gear train, the improvement which comprises means for selecting a desired output speed, means for starting rotation of a driving gear of said gear train, means for interrupting said starting means to cause said driving gear to rotate freely, means for shifting a driven gear of said gear train in mesh with said driving gear to produce the desired output speed while said driving gear is rotating freely, and means for sensing completion of mesh between said driving and driven gears and for resuming rotation of said driving gear at the desired output speed, said means for sensing completion of gear mesh and for resuming rotation of said driving gear including cam means responsive to said shifting means, switch means responsive to said cam means, and a starting coil responsive to said switch means for causing rotation of said driving gear at the desired speed.

13. A transmission mechanism having a gear train for providing a plurality of output speeds of said gear train, the improvement which comprises means for selecting a desired output speed, means for starting rotation of a driving gear of said gear train, means for interrupting said starting means to cause said driving gear to rotate freely, and means for shifting a driven gear of said gear train in mesh with said driving gear to produce the desired output speed while said driving gear is rotating freely, said starting means including means responsive to said selecting means for delaying rotation of said driving gear a predetermined time interval, thereby permitting said shifting means to cause engagement by said driven gear with said stationary driving gear before the driving gear is rotated.

14. A transmission mechanism in accordance with claim 13, wherein said starting means and said delaying means include a start switch, a relay responsive to operation of said start switch, a time delay relay in parallel with said preceding relay also responsive to operation of said start switch, and a starting coil responsive to said time delay relay after a predetermined interval of operation of said time delay relay for rotating said driving gear.

References Cited

UNITED STATES PATENTS

| | | | |
|---|---|---|---|
| 2,788,675 | 4/1957 | Hosea | 74—335 |
| 3,058,364 | 10/1962 | Alfieri | 74—365 |
| 2,912,875 | 11/1959 | Berthiez | 74—339 |
| 3,329,038 | 7/1967 | Peras | 74—339 |

DONLEY J. STOCKING, *Primary Examiner.*

THOMAS C. PERRY, *Assistant Examiner.*

U.S. Cl. X.R.

74—334, 335, 365, 850